United States Patent [19]

Niblett

[11] Patent Number: 4,582,040
[45] Date of Patent: Apr. 15, 1986

[54] FUEL PREHEATER AND EMISSION CONTROL DEVICE

[76] Inventor: Norman C. Niblett, P.O. Box 590, Salisbury, Md. 21801

[21] Appl. No.: 726,031

[22] Filed: Apr. 23, 1985

[51] Int. Cl.⁴ ............................................. F02M 31/00
[52] U.S. Cl. ...................................... 123/557; 165/51
[58] Field of Search ................. 123/557, 552; 165/51, 165/52; 261/144, 145

[56] References Cited

U.S. PATENT DOCUMENTS

| | | | |
|---|---|---|---|
| 4,436,075 | 3/1984 | Campbell | 123/557 |
| 4,458,642 | 7/1984 | Okubo | 123/557 |
| 4,463,739 | 8/1984 | Niblett | 123/557 |

*Primary Examiner*—Ronald H. Lazarus
*Attorney, Agent, or Firm*—Gordon L. Peterson

[57] ABSTRACT

A fuel preheater and emission control device for heating fuel being supplied through a fuel conduit from a fuel supply to the engine, and thereby improving its combustion. Fuel heating is accomplished as a result of heat exchange between the fuel and engine coolant flowing in a coolant conduit. The preheater comprises a coolant tube adapted to have heated coolant flow therethrough and a fuel tube adapted to have fuel flow therethrough enroute to the engine. The fuel tube includes a coil having a plurality of convolutions extending around the exterior of the coolant tube and a downstream section extending for a substantial distance within the coolant tube. The region of the downstream section between the most downstream convolution and the location at which the downstream section enters the coolant tube is spaced from the coolant tube in a way to minimize the likelihood of vapor lock, while the downstream section assures adequate fast heating for improved cold-weather performance and emission control.

4 Claims, 4 Drawing Figures

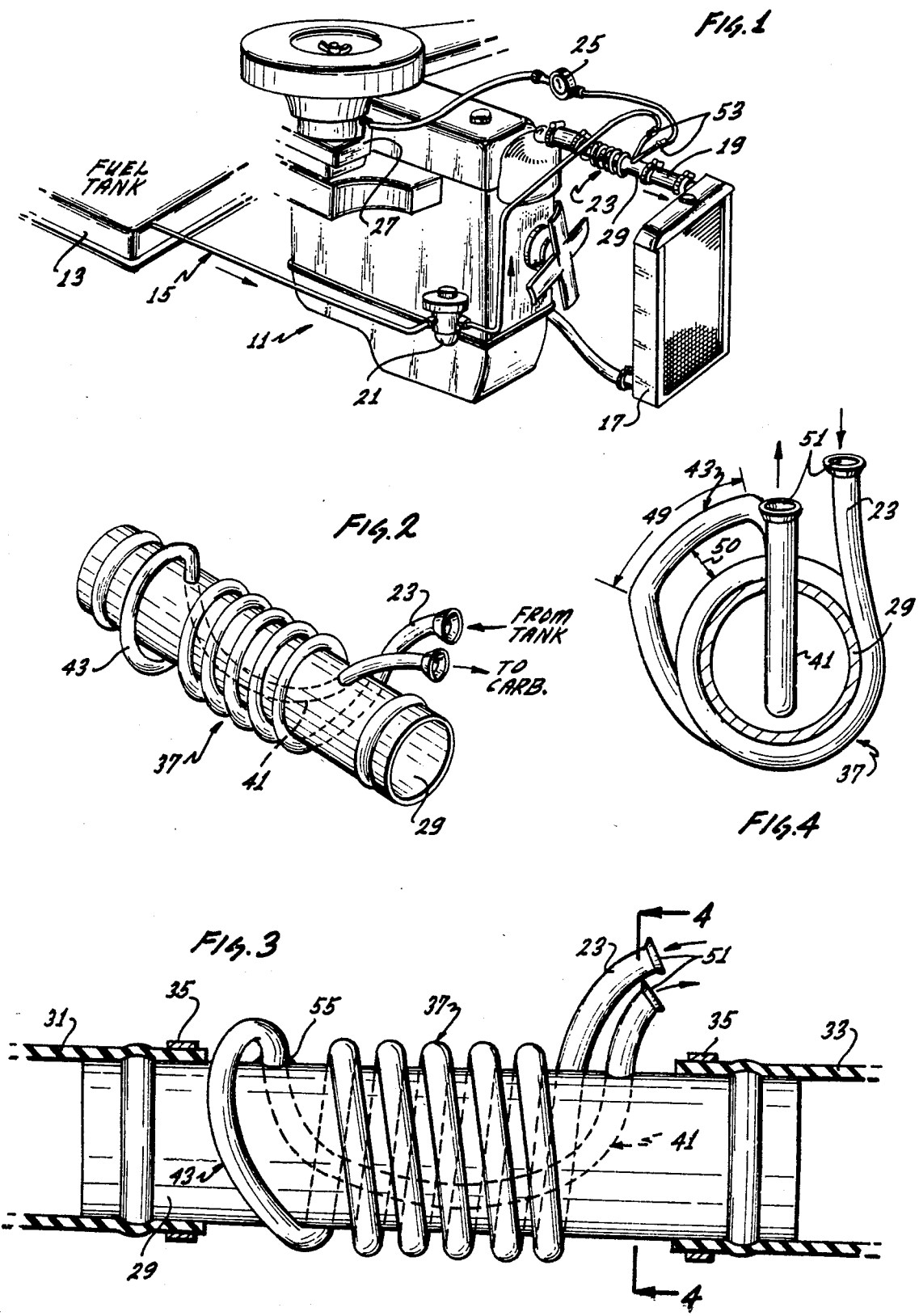

FUEL PREHEATER AND EMISSION CONTROL DEVICE

BACKGROUND OF THE INVENTION

It has long been recognized that the efficiency and fuel economy of an internal combustion engine can be improved by preheating the fuel supplied to the carburetor. Fuel preheating can be accomplished by passing the fuel enroute to the carburetor in heat exchange relationship with engine coolant. Prior art fuel preheaters are shown by way of example in Dunnam U.S. Pat. No. 4,091,782, Rabbiosi U.S. Pat. No. 3,986,486 and DeShaies U.S. Pat. No. 3,253,647, as well as in my U.S. Pat. Nos. 4,476,839 and 4,463,739.

My aforesaid patents disclose a fuel preheater which is adapted for use with an engine coolant system which includes a coolant tube through which coolant can flow and a fuel tube for supplying fuel from a fuel supply to the engine. A portion of the fuel tube forms a coil extending around the exterior of the coolant tube in heat exchange relationship therewith.

One problem with prior art fuel preheaters was that they tended to produce vapor lock under at least some operating conditions. Thus, vapor lock was more likely to occur, for example, on high compression engines or on engines operating in hot desert climates. My U.S. Pat. No. 4,463,739 addressed that problem, but it was found that although the invention disclosed in that patent solved the vapor lock problem, the system was not adequately efficient in very cold climates.

SUMMARY OF THE INVENTION

The present invention provides a fuel preheater which combines superior cold-weather performance and emission control with vapor lock prevention. The invention is based on the recognition that both of these somewhat contradictory objectives can be accomplished by a structure in which the fuel is first gradually heated by extended exterior contact with the coolant tube, then cooled in the spaced convolution of the fuel tube, and finally reheated at a faster pace by immersion of the fuel tube into the coolant itself through a distance which is substantial yet smaller than the distance covered by the fuel tube in the coolant-tube-contacting helix.

The use of the present invention has been found to result in a surprising reduction of carbon monoxide and hydrocarbon emissions, apparently due to the more complete combustion of the properly pre-warmed fuel, even in the absence of a catalytic converter.

The present invention can be embodied in a fuel preheater of the type disclosed in my aforesaid patents, in which a fuel tube includes a coil having a plurality of convolutions extending around the exterior of a coolant tube in heat exchange relationship therewith so the coolant in the coolant tube can preheat the fuel in the coil. A downstream section of the fuel tube extends axially through the coolant tube for a substantial distance. The most downstream of the convolutions terminates in the downstream section.

The region of the downstream section between the most downstream convolution and the location at which the downstream section enters the coolant tube is spaced from the coolant tube by a gap which should be at its maximum for a distance of at least 1 1/16 inch for a 1½ inch diameter coolant line and preferably no greater than about 1¼ inch. Although results can differ from engine to engine, generally I consider a distance of 1⅛ inch to be optimum for vapor lock prevention purposes.

The gap referred to is measured between the outside adjacent surfaces of the coolant tube and the fuel tube. Because the region joins a convolution which preferably contacts the coolant tube with a segment of the fuel tube which projects through the coolant tube, in a typical instance, the spacing between the tubes, i.e., the gap, will not be of constant radial dimension. It is the maximum or largest radial dimension of this gap which must be of at least the specified length.

This invention also preferably employs an adjustable pressure regulator in the fuel tube located between the downstream section and the engine or elsewhere. Although fuel pressure regulators at this location are known, an advantage of the adjustability feature is that the fuel pressure can be tailored, not only to individual vehicle requirements, but to the changing pressure requirements of the vehicle. Thus, it has been found that, after using the fuel preheater of this invention with a particular engine for a length of time, the pressure regulator can be adjusted to better meet the demands of the engine.

The invention, together with additional features and advantages thereof, may best be understood by reference to the following description taken in connection with the accompanying illustrative drawing.

BRIEF DESCRIPTION OF THE DRAWING

FIG. 1 is a somewhat schematic perspective view of an automobile engine having a fuel preheater constructed in accordance with the teachings of this invention installed thereon;

FIG. 2 is a detail perspective view of the fuel preheater of this invention;

FIG. 3 is an enlarged elevational view taken generally of the preheater of FIG. 2; and FIG. 4 is a transverse vertical section along line 4—4 of FIG. 3.

DESCRIPTION OF THE PREFERRED EMBODIMENT

FIG. 1 shows an engine 11 adapted to receive fuel from a fuel tank 13 via a fuel conduit 15 and to be cooled by coolant furnished by a radiator 17 furnished to the engine by a coolant conduit 19. The fuel supply system includes a fuel pump 21 coupled into the fuel conduit 15, a fuel tube 23 forming a portion of the fuel conduit, an adjustable pressure regulator 25 coupled into the fuel conduit, and a carburetor 27 downstream of the pressure regulator. The coolant conduit 19 includes a coolant tube 29.

The fuel tube 23 and the coolant tube 29 form the primary elements of the heat exchanger which preheats the fuel flowing to the engine utilizing heated engine coolant flowing from the engine to the radiator. As shown in FIGS. 2 and 3, the coolant tube 29 is a separate, relatively short tube which is preferably constructed of a metal having high thermal conductivity. Its opposite ends can be suitably attached to a radiator hose sections 31 and 33 which form portions of the coolant conduit 19 by conventional hose clamps 35.

The fuel tube 23 includes a coil or helix 37 having a plurality of convolutions wrapped tightly around the exterior of the coolant tube 29 to provide good heat transfer. The coil includes a most downstream convolution 39 and a downstream portion 41 which extends through the coolant tube 29 in a generally axial direction, preferably for a distance at least as great as the axial dimension of the helix 37. A region 43 of the fuel tube 23 between the most downstream convolution 39 and a location 45 at which the downstream section enters the coolant tube 29 is spaced from the coolant tube by a gap 47. This gap has a length 49 at maximum radial dimension 50 which in the preferred embodiment is 1⅛ inch. The maximum gap 50 is measured in a direction radially of the coolant tube 29. As indicated above, the maximum dimension should have a length of at least 1 1/16 inch and is preferably less than 1¼ inch. The fuel tube 23 has opposite ends 51 which are coupled into adjacent sections of the fuel conduit by conventional clamps 53 (FIG. 1).

The fuel tube 23 is preferably constructed of a metal having high thermal conductivity, and the downstream section 41 is appropriately sealed to the coolant tube 29 at the locations where the downstream section passes through the coolant tube. The fuel tube 23 and the coolant tube 29 can be easily retrofitted into an existing fuel system using the clamps 35 and 53.

In use, fuel is pumped by the fuel pump 21 from the fuel tank 13 through the fuel tube 23 and the pressure regulator 25 to the carburetor 27. The pressure regulator can be manually set to provide the desired fuel pressure downstream of the regulator. The fuel passing through the coil 37 is heated by the warm coolant passing through the coolant tube 29. The presence of the region 43 with the maximum dimension 49 as defined above then cools the fuel slightly and materially reduces the likelihood of vapor lock. Finally, the immersed portion 41 of this invention reheats the fuel more intensely through a length of the fuel tube 23 which is substantial but shorter than the fuel tube length contained in the coil or helix 37. It is this latter portion which considerably enhances the cold weather performance of the engine 11, and reduces its carbon monoxide and hydrocarbon emissions. It will be understood that the immersed portion 41 of the fuel tube 23 can extend either to the right or to the left from its entry point 55 in FIG. 3. Bringing the portion 41 back through the coil 37 as shown in the drawings, however, allows the coolant tube 29 to be made shorter and facilitates the attachment of the fuel tube 23 to the fuel system by keeping the inlet and outlet of the fuel tube 23 close together.

Although an exemplary embodiment of the invention has been shown and described, many changes, modifications and substitutions may be made by one having ordinary skill in the art without necessarily departing from the spirit and scope of this invention.

I claim:

1. In a liquid-cooled engine having a radiator and an engine block connected thereto by a coolant conduit forming a coolant path, and having a fuel line for conveying fuel from a fuel pump to said engine for combustion, the improvement comprising:
(a) a metallic coolant tube inserted in said coolant path between said radiator and said engine block so as to cause coolant to flow through said coolant tube;
(b) a metallic fuel tube in said fuel line between said fuel pump and said engine;
(c) said fuel tube being disposed in a generally helical manner around the outside of said coolant tube and in direct contact therewith;
(d) an end convolution of said helical fuel tube being formed to have a portion entering and exiting said coolant tube and extending therethrough in a direction generally axial thereof between said entrance and exit; and
(e) a portion of said helical fuel tube intermediate said portion in direct contact with said coolant tube and said portion extending through said coolant tube being substantially spaced from and thereby not in contact with said coolant tube.

2. The improvement of claim 1, in which said portion extending through said coolant tube extends within said coolant tube for a distance at least equal to the axial extent of said fuel tube helix.

3. The improvement of claim 2, in which said portion extending through said coolant tube extends through the interior of said fuel tube helix and exits from said coolant tube in the vicinity of the first convolution of said helix.

4. The improvement of claim 1, in which said portion extending through said coolant tube is curved so as to increase its path length between its entrance into and its exit from said coolant tube.

* * * * *